(12) United States Patent
Yamasuge (10) Patent No.: US 8,374,259 B2
(45) Date of Patent: Feb. 12, 2013

(54) TRANSMITTING APPARATUS, COMMUNICATION SYSTEM, TRANSMITTING METHOD AND PROGRAM

(75) Inventor: Hiroyuki Yamasuge, Tokyo (JP)

(73) Assignee: Sony Corporation, Tokyo (JP)

( * ) Notice: Subject to any disclaimer, the term of this patent is extended or adjusted under 35 U.S.C. 154(b) by 1041 days.

(21) Appl. No.: 12/348,966

(22) Filed: Jan. 6, 2009

(65) Prior Publication Data

US 2009/0180560 A1 Jul. 16, 2009

(30) Foreign Application Priority Data

Jan. 11, 2008 (JP) ............................... P2008-005070

(51) Int. Cl.
*H04K 1/10* (2006.01)
*H04L 27/28* (2006.01)

(52) U.S. Cl. ........................................ 375/260; 375/259

(58) Field of Classification Search .................... 375/260
See application file for complete search history.

(56) References Cited

U.S. PATENT DOCUMENTS

| | | | |
|---|---|---|---|
| 6,275,522 B1 | 8/2001 | Johnson et al. | |
| 2004/0009783 A1 | 1/2004 | Miyoshi | |
| 2006/0153309 A1 | 7/2006 | Tang et al. | |
| 2007/0147226 A1* | 6/2007 | Khandekar et al. | 370/208 |
| 2007/0223608 A1 | 9/2007 | Nakayama et al. | |
| 2007/0258394 A1* | 11/2007 | Hamaguchi | 370/310 |
| 2007/0291636 A1 | 12/2007 | Rajagopal et al. | |
| 2008/0031376 A1* | 2/2008 | Ban | 375/271 |
| 2009/0207926 A1* | 8/2009 | Huang et al. | 375/260 |

FOREIGN PATENT DOCUMENTS

| | | |
|---|---|---|
| EP | 2 128 992 A1 | 12/2009 |
| JP | 2006-287357 | 10/2006 |
| JP | 2006-304152 | 11/2006 |
| JP | 2007-60410 | 3/2007 |
| JP | 2007-88856 | 4/2007 |
| JP | 2007-88941 | 4/2007 |
| JP | 2007-166068 | 6/2007 |
| JP | 2007-243235 | 9/2007 |
| JP | 2007-243236 | 9/2007 |
| JP | 2007-258904 | 10/2007 |
| JP | 2008-5324 | 1/2008 |
| WO | WO 2007/148579 A1 | 12/2007 |
| WO | WO 2008/032912 A1 | 3/2008 |
| WO | WO 2008/072188 A1 | 6/2008 |

OTHER PUBLICATIONS

European Search Report in related application EP 09 250 018 (Feb. 18, 2010).

* cited by examiner

*Primary Examiner* — Erin File
(74) *Attorney, Agent, or Firm* — Finnegan Henderson Farabow Garrett & Dunner LLP (57) ABSTRACT

A transmitting apparatus includes a transmission power reducing section to reduce a power of a transmission signal in a prescribed frequency band of a multicarrier signal containing a plurality of subcarriers and change the prescribed frequency band in which the power of the transmission signal is reduced in time sequence. In this configuration, when detecting an interfered system by reducing a transmission power in the prescribed frequency band, it is possible to minimize the bandwidth of the prescribed frequency band and thereby minimize degradation of reception characteristics due to the reduction of the transmission power.

7 Claims, 11 Drawing Sheets

TRANSMITTING APPARATUS, COMMUNICATION SYSTEM, TRANSMITTING METHOD AND PROGRAM

CROSS REFERENCES TO RELATED APPLICATIONS

The present invention contains subject matter related to Japanese Patent Application JP 2008-005070 filed in the Japan Patent Office on Jan. 11, 2008, the entire contents of which being incorporated herein by reference.

BACKGROUND OF THE INVENTION

1. Field of the Invention

The present invention relates to a transmitting apparatus, a communication system, a transmitting method and a program.

2. Description of the Related Art

Communication technology called orthogonal frequency division multiplexing (OFDM) is known in the wireless communication field or the like. The technology is a digital modulation technique that arranges a plurality of subcarriers at regular frequency intervals and transmits information through each subcarrier. According to this technology, a plurality of carriers can be arranged densely without interfering with each other so as to realize broadband transmission with effective use of a narrow frequency range. It is thereby possible to increase the frequency use efficiency and it is thus suitable for high-speed data transmission.

For example, the Institute of Electrical and Electronic Engineers (IEEE) 802.11a, which is one of wireless local area network (LAN) standards, wirelessly transmits data by the OFDM technology. Further, ultra wideband (UWB) technology, which is being promoted for the practical use, transmits a multicarrier signal using a high frequency such as the GHz band with a relatively wide bandwidth.

In the OFDM communication technology that uses a carrier in a relatively wide band, interference with a carrier used in another communication network (which is referred to hereinafter as an interfered system) possibly occurs. This occurs, for example, in the case where a cellular phone in another communication network performs communication using a prescribed frequency that is included in the frequency band of a multicarrier signal. Because the occurrence of such interference causes degradation of a communication quality and even leads to a failure in communication, it is necessary to take appropriate measures to prevent the occurrence of interference at the OFDM transmitting end. As one of the measures, technology called detect and avoid (DAA) has been studied recently. The DAA is a technique that, when transmitting a multicarrier signal, stops transmission of a particular frequency band (e.g. a subcarrier unit) in a relatively wide frequency band for wireless transmission.

Generally, when the existence of an interfered system is not detected, transmission is performed in the whole range of the frequency band for wireless transmission. However, if transmission is performed by the OFDM technology in the whole range of the frequency band for wireless transmission on the assumption that no interfered system exists, it may be impossible to detect the existence of an interfered system, when it exists, due to noise generated by the transmission. Further, if transmission is performed always using the whole range of the frequency band, it is difficult to perform communication by avoiding the frequency band of an interfered system in the case where there is an interfered system whose existence is not detected or an interfered system newly becomes active, for example.

To avoid this, a technique that detects the existence of an interfered system by setting a period (silent period (SP)) during which a transmission power is reduced for a given length of time at regular time intervals in subcarrier transmission in a frequency band allocated to an interfered system has been introduced. This technique enables reliable detection of the existence of an interfered system during the silent period.

Figure 10A:
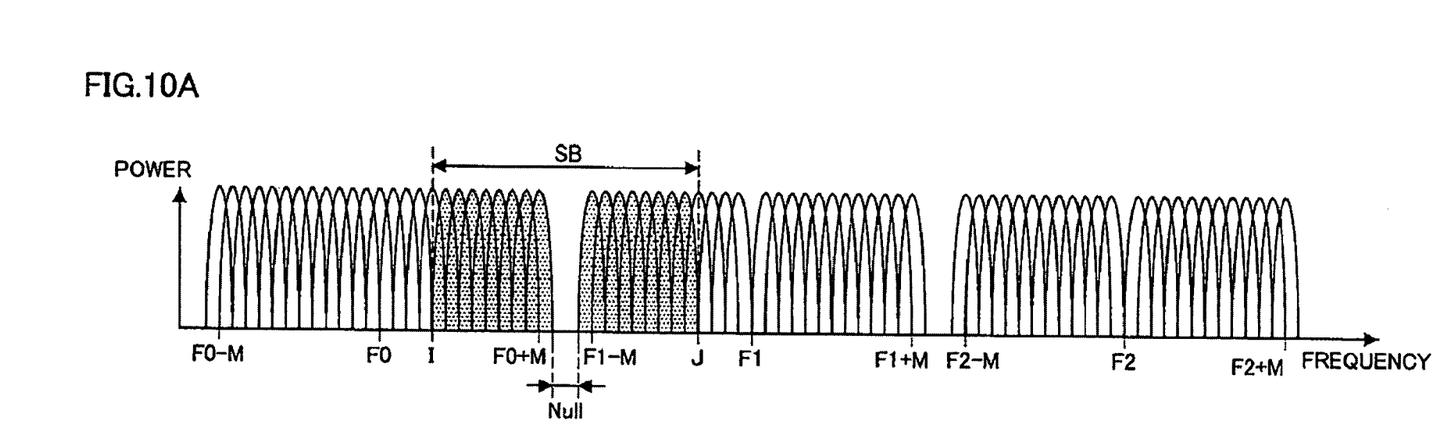
FIG. 10 is a schematic view to explain a silent period.
Figure 10B:
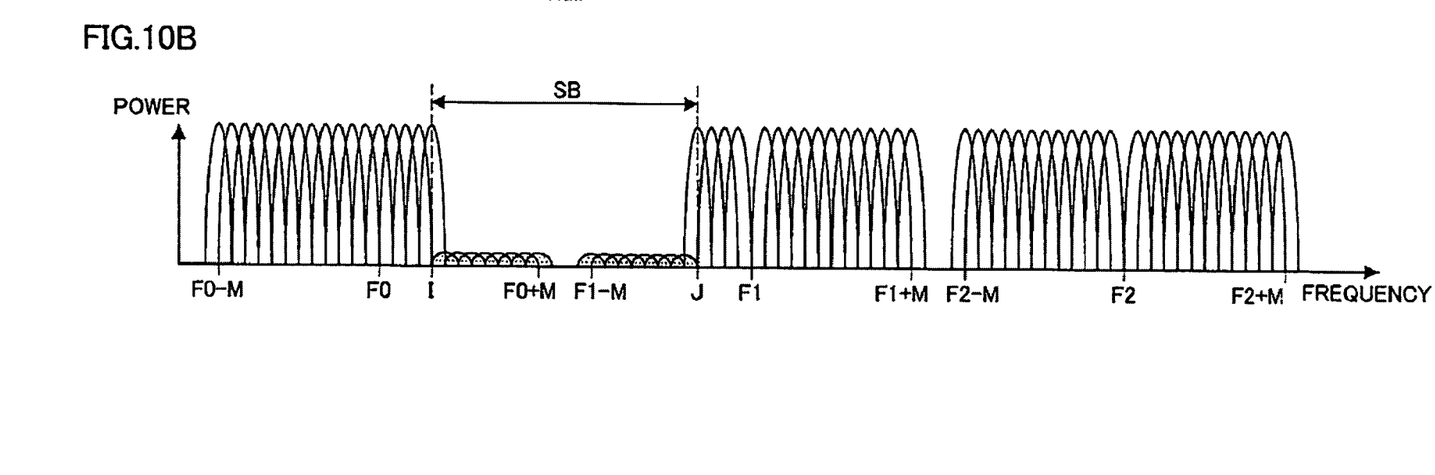
Figure 11:
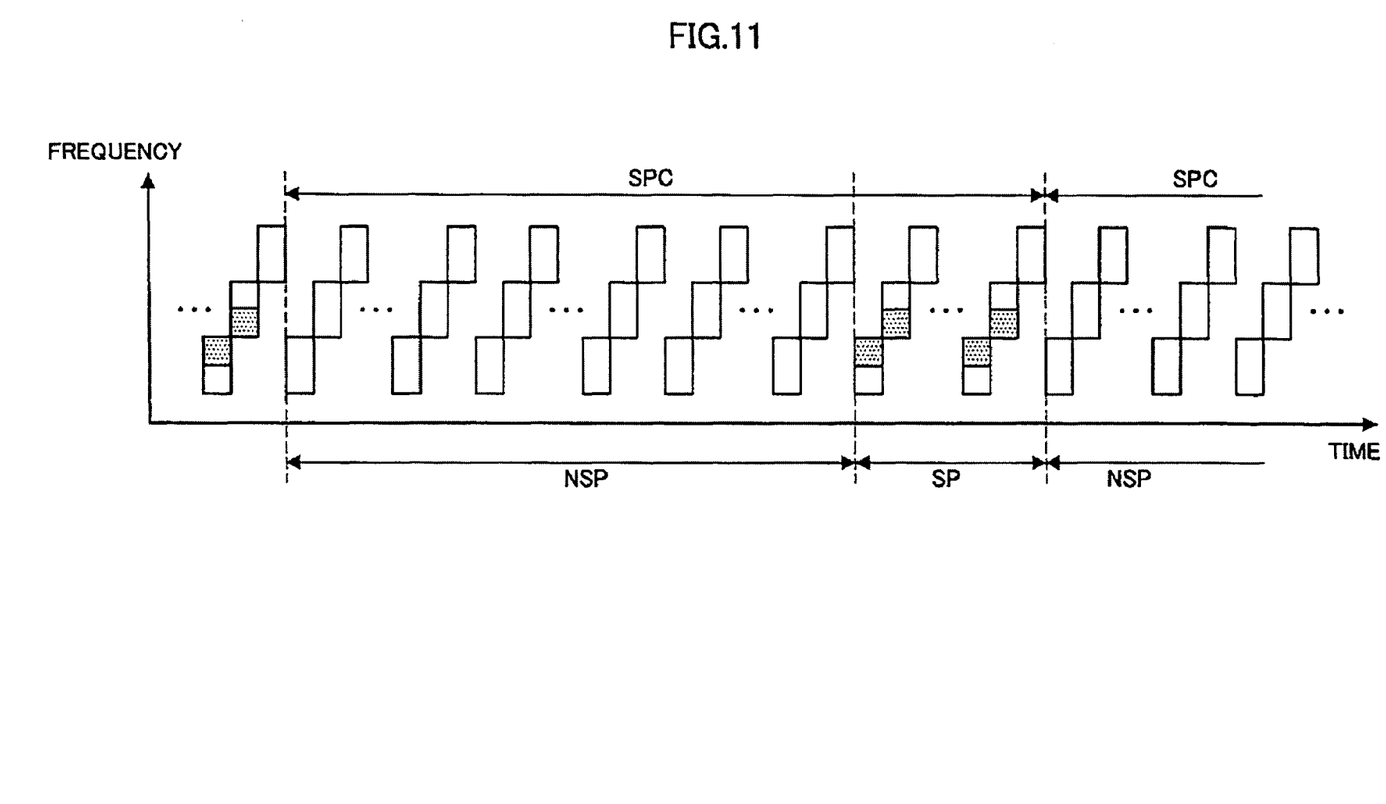
FIG. 11 is a schematic view to explain a silent period.

FIGS. 10 and 11 are schematic views to explain the silent period. FIG. 10 is a schematic view showing a subcarrier before performing time domain transform by an inverse fast Fourier transformer (IFFT) of a transmitting apparatus in the frequency domain. As shown in FIG. 10, a frequency band (SB) in which an interfered system possibly exists is specified in advance. The frequency band of an interfered system varies by country and region, and in the WiMAX standard in Europe, for example, it is mandatory to reduce a transmission power in a prescribed frequency band when the band is used by the WiMAX (interfered system).

If the existence of an interfered system is not detected, a signal is transmitted in the whole frequency range as shown in FIG. 10($a$). On the other hand, a transmission power is reduced in the frequency band SB in which an interfered system possibly exists as shown in FIG. 10($b$).

The reduction of a transmission power is performed at regular time intervals. FIG. 11 is a schematic view showing the silent period in the time domain after performing time domain transform by the IFFT in the transmitting apparatus. In FIG. 11, the reduction of a transmission power is performed during the silent period SP (the portion indicated by dots in FIG. 11). Each regular interval including the silent period SP is referred to as SPC, and transmission is performed without reducing a transmission power as shown in FIG. 10($a$) during a non-silent period (NSP) in the SPC. On the other hand, transmission is performed by reducing a transmission power in the frequency band SB in which an interfered system possibly exists as shown in FIG. 10($b$) during the silent period SP in the SPC. The silent period time SP, the interval SPC, and the frequency band SB in which transmission is to be avoided may be regulated by the legal system of the country in which an interfered system exists.

Setting the silent period prevents noise in the OFDM transmission from affecting the detection of an interfered system when the interfered system exists. It is thereby possible to reliably detect the interfered system during the silent period. After detecting the interfered system, transmission is stopped only in the particular frequency band used by the interfered system by the DAA technology, thereby suppressing the effect on the interfered system.

[Patent document 1] Japanese Unexamined Patent Application Publication No. 2007-166068

[Patent document 2] Japanese Unexamined Patent Application Publication No. 2007-258904

[Patent document 3] Japanese Unexamined Patent Application Publication No. 2007-243235

[Patent document 4] Japanese Unexamined Patent Application Publication No. 2007-243236

SUMMARY OF THE INVENTION

However, if the silent period is set according to the above-described technique, a transmission power is reduced in a relatively wide frequency band in which an interfered system possibly exists, which causes degradation of reception characteristics during the silent period. The significant degradation of reception characteristics causes an increase in a retransmission signal or the like in spite of rate adaptation and so on, resulting in a decrease in overall throughput.

Further, a carrier to be transmitted is normally spread by a technique such as interleaving, frequency domain spreading and time domain spreading in order to suppress the degradation of reception characteristics. However, if a transmission power is reduced in a relatively wide frequency band as shown in FIGS. 10 and 11, a large part of the spread signal is contained in the frequency band in which a transmission power is reduced, making it difficult to decode the signal in a receiving apparatus. In such a case, the reception characteristics of a particular signal with a reduced transmission power continue to be degraded even if an overall transmission rate is lowered. Therefore, the reception characteristics are degraded each time a transmission power is reduced in the silent period, causing an error in a reception packet.

In light of the foregoing, it is desirable to provide a novel and improved transmitting apparatus, a communication system, a transmitting method and a program capable of reliably detecting the existence of an interfered system without degrading reception characteristics.

According to an embodiment of the present invention, there is provided a transmitting apparatus including a transmission power reducing section to reduce a power of a transmission signal in a prescribed frequency band of a multicarrier signal containing a plurality of subcarriers, wherein the transmission power reducing section changes the prescribed frequency band in which the power of the transmission signal is reduced in time sequence.

In the above configuration, the power of the transmission signal is reduced in the prescribed frequency band of the multicarrier signal containing the plurality of subcarriers, and the prescribed frequency band in which the power of the transmission signal is reduced is changed in time sequence. Therefore, when detecting an interfered system by reducing a transmission power in the prescribed frequency band, it is possible to minimize the bandwidth of the prescribed frequency band and thereby minimize degradation of reception characteristics due to the reduction of the transmission power.

The transmission power reducing section may reduce the power of the transmission signal in the prescribed frequency band equivalent to at least a part of a band corresponding to an interfered system and change the prescribed frequency band in time sequence within the band corresponding to the interfered system. In this configuration, because the power of the transmission signal is reduced in at least a part of the band corresponding to the interfered system, and thus the transmission power is not reduced in the whole range of the band corresponding to the interfered system, it is possible to reliably suppress degradation of reception characteristics.

The number of patterns of change in the prescribed frequency band may be set to a value obtained by dividing an interval of a silent period to be set for avoiding the interfered system by a time of the silent period. In this configuration, because the prescribed frequency band in which the transmission power is reduced is spread over the number of patterns obtained by dividing the interval of the silent period by the time of the silent period, it is possible to suppress degradation of reception characteristics more reliably than the case of reducing the transmission power in the bandwidth of the silent period.

The bandwidth of the prescribed frequency band may be set to a value obtained by dividing a bandwidth corresponding to the interfered system by the number of patterns. In this configuration, because the prescribed frequency band in which the transmission power is reduced is set to the value obtained by dividing the bandwidth corresponding to the interfered system by the number of patterns, it is possible to suppress degradation of reception characteristics more reliably than the case of reducing the transmission power in the bandwidth of the silent period.

The transmitting apparatus may further include an antenna to transmit the transmission signal. In this configuration, when the transmitting apparatus including the antenna to transmit the transmission signal detects an interfered system by reducing a transmission power in the prescribed frequency band, it is possible to minimize the bandwidth of the prescribed frequency band and improve reception characteristics.

According to another embodiment of the present invention, there is provided a communication system including a transmitting apparatus and a receiving apparatus connected over a wireless communication network, wherein the transmitting apparatus includes a transmission power reducing section to reduce a power of a transmission signal in a prescribed frequency band of a multicarrier signal containing a plurality of subcarriers and change the prescribed frequency band in which the power of the transmission signal is reduced in time sequence, and the receiving apparatus includes a waveform shaping section to shape a waveform of a reception signal by cyclic addition to add a signal component extending off an effective symbol portion of a signal received from the transmitting apparatus to an opposite end of the effective symbol portion.

In the above configuration, in the communication system in which the transmitting apparatus and the receiving apparatus are connected over the wireless communication network, the power of the transmission signal is reduced in the prescribed frequency band of the multicarrier signal containing the plurality of subcarriers, and the prescribed frequency band in which the power of the transmission signal is reduced is changed in time sequence in the transmitting apparatus. Therefore, when detecting an interfered system by reducing a transmission power in the prescribed frequency band, it is possible to minimize the bandwidth of the prescribed frequency band and thereby minimize degradation of reception characteristics due to the reduction of the transmission power. Further, in the receiving apparatus, the waveform of the reception signal is shaped by cyclic addition that adds the signal component extending off the effective symbol portion of the signal received from the transmitting apparatus to the opposite end of the effective symbol portion. Therefore, even if the signal waveform is expanded in the time domain due to adjustment of the power of the transmission signal in the transmitting apparatus, it is possible to shape the waveform of the reception signal by the cyclic addition, thereby reliably suppressing degradation of reception characteristics.

According to another embodiment of the present invention, there is provided a transmitting method including the steps of reducing a power of a transmission signal in a prescribed frequency band of a multicarrier signal containing a plurality of subcarriers, and changing the prescribed frequency band in which the power of the transmission signal is reduced in time sequence.

In the above configuration, the power of the transmission signal is reduced in the prescribed frequency band of the multicarrier signal containing the plurality of subcarriers, and the prescribed frequency band in which the power of the transmission signal is reduced is changed in time sequence. Therefore, when detecting an interfered system by reducing a transmission power in the prescribed frequency band, it is possible to minimize the bandwidth of the prescribed frequency band and thereby minimize degradation of reception characteristics due to the reduction of the transmission power.

According to another embodiment of the present invention, there is provided a program to cause a computer to function as a means to reduce a power of a transmission signal in a prescribed frequency band of a multicarrier signal containing a plurality of subcarriers, and a means to change the prescribed frequency band in which the power of the transmission signal is reduced in time sequence.

In the above configuration, the power of the transmission signal is reduced in the prescribed frequency band of the multicarrier signal containing the plurality of subcarriers, and the prescribed frequency band in which the power of the transmission signal is reduced is changed in time sequence. Therefore, when detecting an interfered system by reducing a transmission power in the prescribed frequency band, it is possible to minimize the bandwidth of the prescribed frequency band and thereby minimize degradation of reception characteristics due to the reduction of the transmission power.

According to the embodiments of the present invention described above, it is possible to provide a transmitting apparatus, a communication system, a transmitting method and a program capable of reliably detecting the existence of an interfered system without degrading reception characteristics.

DETAILED DESCRIPTION OF THE PREFERRED EMBODIMENTS

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

Figure 1:
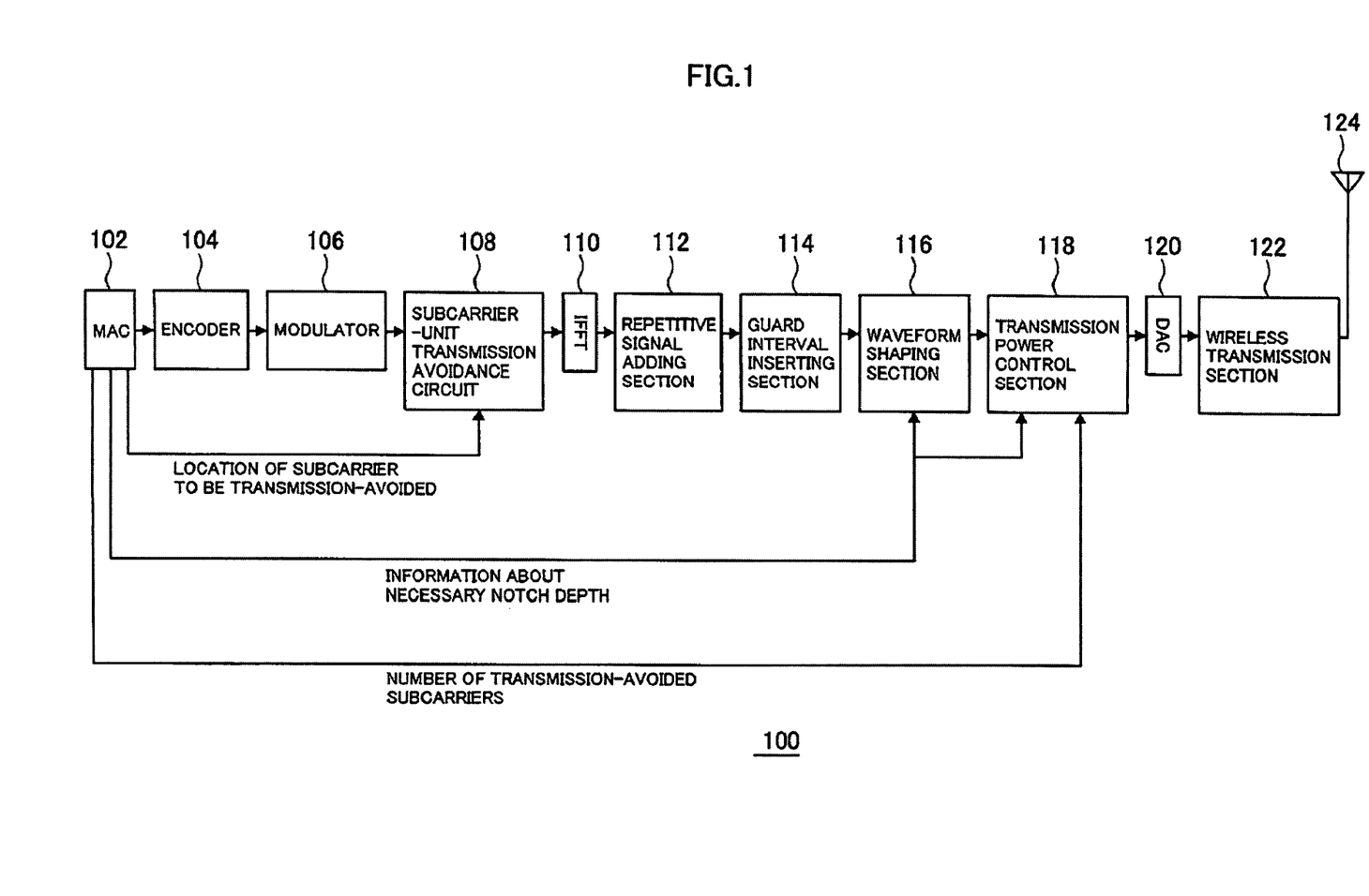
FIG. 1 is a schematic view showing the configuration of a transmitting apparatus according to an embodiment of the present invention.

FIG. 1 is a schematic view showing the configuration of a transmitting apparatus 100 according to an embodiment of the present invention. The transmitting apparatus 100 is an example of an apparatus that performs transmission by OFDM. Referring to FIG. 1, the transmitting apparatus 100 includes a MAC 102, an encoder 104, a modulator 106, a subcarrier-unit transmission avoidance circuit 108, an IFFT 110, a repetitive signal adding section 112, a guard interval inserting section 114, a waveform shaping section 116, a transmission power control section 118, a D-A converter (DAC) 120, a wireless transmitting section 122, and an antenna 124.

Transmission data generated by the MAC 102 is encoded by the encoder 104 and modulated by the modulator 106 for wireless transmission. The transmission data (transmission symbol) modulated by the modulator 106 is transmitted to the subcarrier-unit transmission avoidance circuit 108. Further, information about the location (position) of a subcarrier whose transmission is to be avoided is transmitted from the MAC 102 to the transmission avoidance circuit 108. Based on the information about the location of a subcarrier whose transmission is to be avoided that is transmitted from the MAC 102, the transmission avoidance circuit 108 replaces the data in the designated subcarrier location with a null signal. The processing in the transmission avoidance circuit 108 is described in detail later.

The transmission symbol sequence that is partly replaced with the null signal by the transmission avoidance circuit 108 then undergoes orthogonal transformation from the frequency domain to the time domain by the IFFT 110, thereby being converted into a multicarrier signal. The processing of replacing data with a null signal performed in the transmission avoidance circuit 108 may replace data of only one subcarrier with a null signal or may replace data of a plurality of adjacent subcarriers with a null signal, for example.

Figure 2:
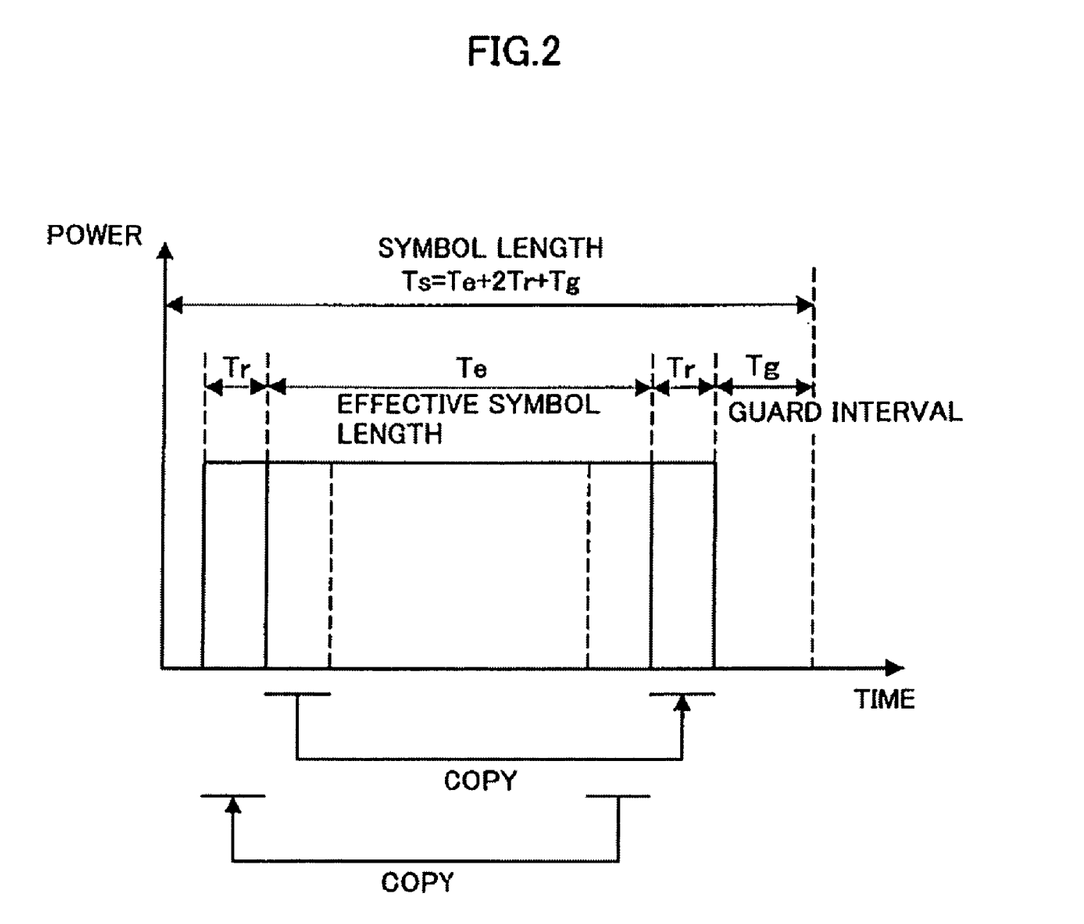
FIG. 2 is a schematic view showing processing to add a repetitive signal in a repetitive signal adding section.

The transmission symbol transformed by the IFFT 110 is transmitted to the repetitive signal adding section 112, and a repetitive signal is added thereto. FIG. 2 is a schematic view showing processing to add a repetitive signal in the repetitive signal adding section 112. As shown in FIG. 2, one transmission symbol length is Ts, and a symbols of a prescribed segment at the front end and the back end of an effective symbol Te in one symbol is added (copied) to the opposite end as a repetitive signal Tr. Although copies Tr of both the front end and the back end of the effective symbol Te are added in the example of FIG. 2, a copy of either one end may be added. FIG. 2 also shows a guard interval Tg that is added by the guard interval inserting section 114. As a result of adding the guard interval Tg, one transmission symbol is represented as: Ts=Te+2Tr+Tg. The guard interval inserting section 114 adds the guard interval Tg by inserting a null signal, for example.

The data of one transmission symbol in which the repetitive signal Tr is added by the repetitive signal adding section 112 and the guard interval Tg is inserted by the guard interval inserting section 114 is supplied to the waveform shaping section 116 where waveform shaping is performed.

Figure 3:
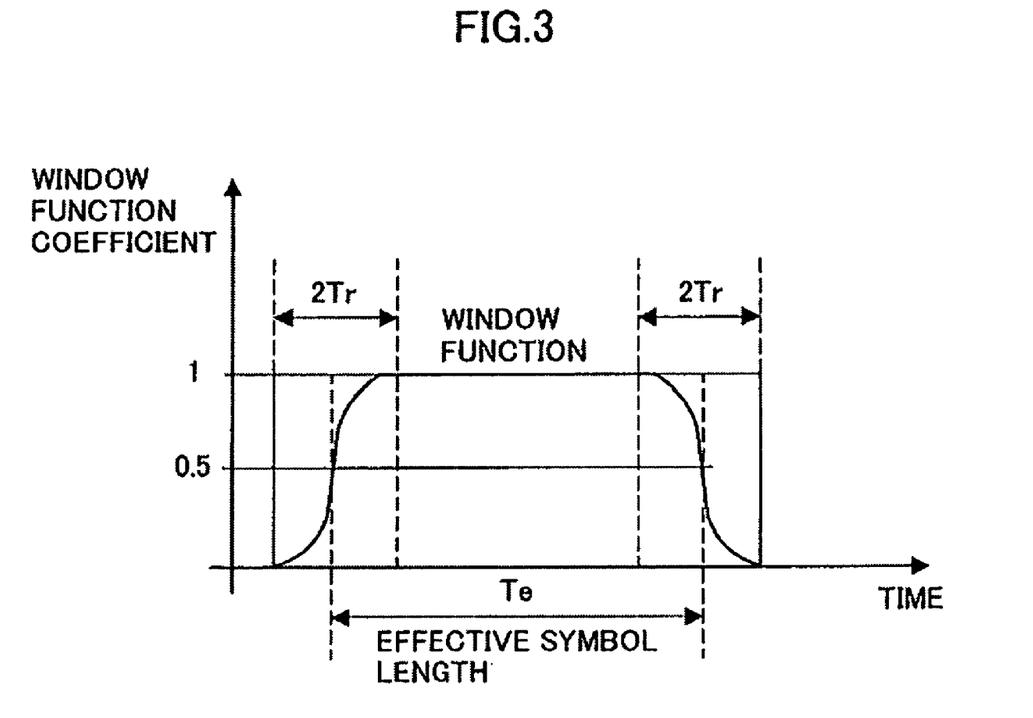
FIG. 3 is a schematic view showing an example of a coefficient of a window function.
Figure 4A:
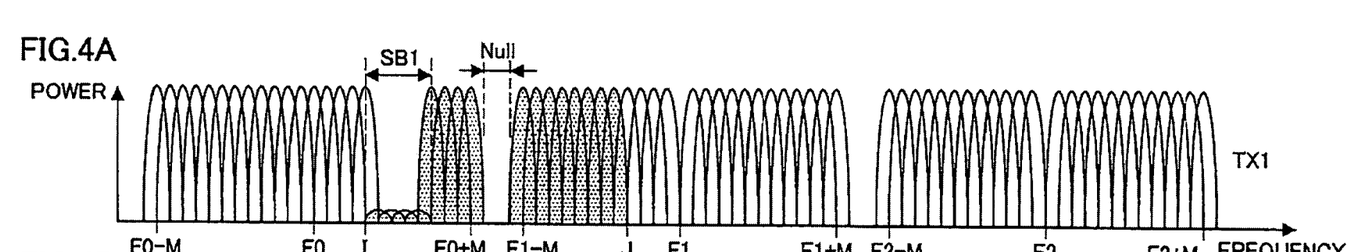
FIG. 4 is a schematic view showing the state where a subcarrier in a transmission avoidance position is replaced with a null signal by a transmission avoidance circuit in the frequency domain.
Figure 4B:
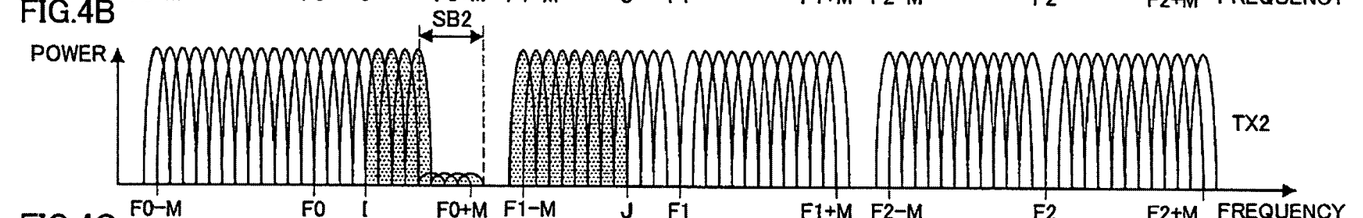
Figure 4C:
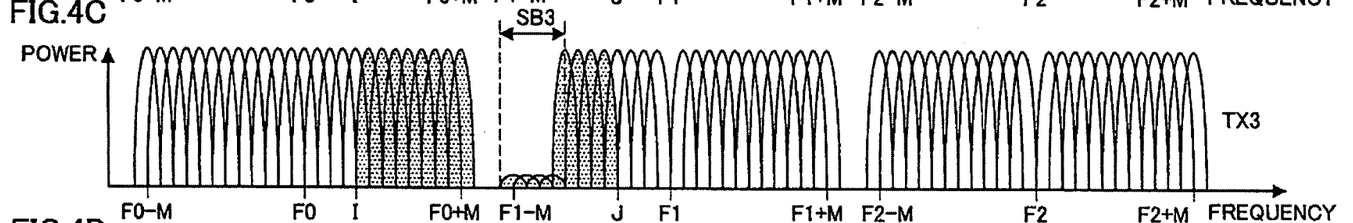
Figure 4D:
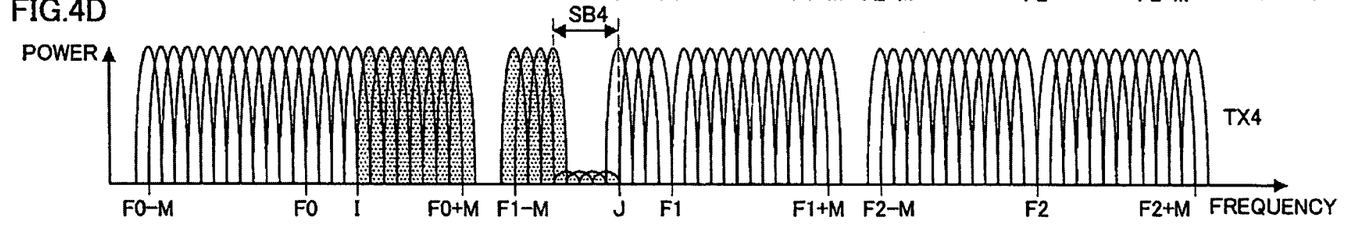

The waveform shaping processing in the waveform shaping section 116 may be window multiplication that multiplies the transmission symbol with the repetitive signal Tr and the guard interval Tg by a coefficient of a window function, for example. FIG. 3 is a schematic view showing an example of a coefficient of a window function. The window function is a function that is set corresponding to the length of the effective symbol Te, of which level gradually increases and decreases at the front end and the back end of the effective symbol Te. The range 2Tr where the level of the window function increases and decreases is set to twice the repetitive signal Tr added by the copying described above. With such setting of the coefficient value of the window function, it is set so that a sum with the value of the window function that is displaced by the effective symbol length always becomes a fixed value. Thus, the energy of the transmission symbol does not exceed the energy of the effective symbol length before multiplication of the window function.

By copying the front end and the back end of the effective symbol Te in one symbol to the opposite end as the repetitive signal Tr as shown in FIG. 2 and performing the waveform shaping using the window function as shown in FIG. 3, it is possible to significantly reduce the level of a sidelobe, which is sideward expansion of the signal of one transmission symbol. Further, if transmission of data of a subcarrier in a particular frequency position is stopped by replacing it with a null signal, the signal level (transmission power) at the position where transmission is stopped is also reduced in the same manner that the level of the sidelobe is reduced. Therefore, even if transmission of the subcarrier in a part of one transmission symbol is stopped, it is possible to suitably demodulate only the data sent by the transmitted subcarrier at the receiving end of the transmission signal without being affected by the subcarrier whose transmission is stopped.

The transmission power control section 118 adjusts the overall transmission power in a time-domain waveform using the number of transmission-avoided subcarriers and a power level in the transmission avoidance position (information about a notch depth in the transmission avoidance position) as parameters. Because a transmission power is lowered when the notch is deep more than when the notch is shallow, the transmission power control section 118 increases the overall signal level as the notch is deepened so as to add the amount of power reduced by the notch as the overall signal power. Further, because a transmission power is lowered as the number of transmission-avoided subcarriers is larger, the transmission power control section 118 increases the overall signal level as the number of transmission-avoided subcarriers is larger.

The signal with a transmission power controlled by the transmission power control section 118 is supplied to the D-A converter 120 and converted into an analog signal. The converted analog signal is supplied to the wireless transmitting section 122 and wirelessly transmitted at a prescribed transmission frequency from the antenna 124 connected thereto.

The processing in the transmission avoidance circuit 108 is described hereinafter in detail. FIG. 4 is a schematic view showing the state where the subcarrier in the transmission avoidance position is replaced with a null signal by the transmission avoidance circuit 108 in the frequency domain. The signals TX1, TX2, TX3 and TX4 respectively shown in FIGS. 4(a) to 4(d) are signals whose subcarrier in a prescribed frequency band is replaced with a null signal by the transmission avoidance circuit 108 after being output from the modulator 106.

As shown in FIGS. 4(a) to 4(d), a transmission-limited band in which the subcarrier is replaced with a null signal in the frequency domain is set to four different bands. Specifically, in the signal TX1, the transmission-limited band SB1 is replaced with a null signal within the frequency range of plus-minus M from the center frequency F0. Likewise, in the signal TX2, the band SB2 is replaced with a null signal within the frequency range of plus-minus M from the center frequency F0. In the signal TX3, the band SB3 is replaced with a null signal within the frequency range of plus-minus M from the center frequency F1. In the signal TX4, the band SB4 is replaced with a null signal within the frequency range of plus-minus M from the center frequency F1.

The bands SB1 to SB4 that are replaced with null signals correspond to the frequency band in which an interfered system possibly exists (the band SB in FIG. 10). In this manner, in this embodiment, only a part of the particular frequency band in which an interfered system possibly exists is replaced with a null signal, and the band to be replaced with a null signal is varied within the band SB.

The information about the bands SB1 to SB4 whose transmission is to be avoided is periodically transmitted from the MAC 102 to the transmission avoidance circuit 108. Based on the periodically transmitted information, the transmission avoidance circuit 108 changes the band to be replaced with a null signal in time sequence in the order of SB1, SB2, SB3 and SB4.

Figure 5:
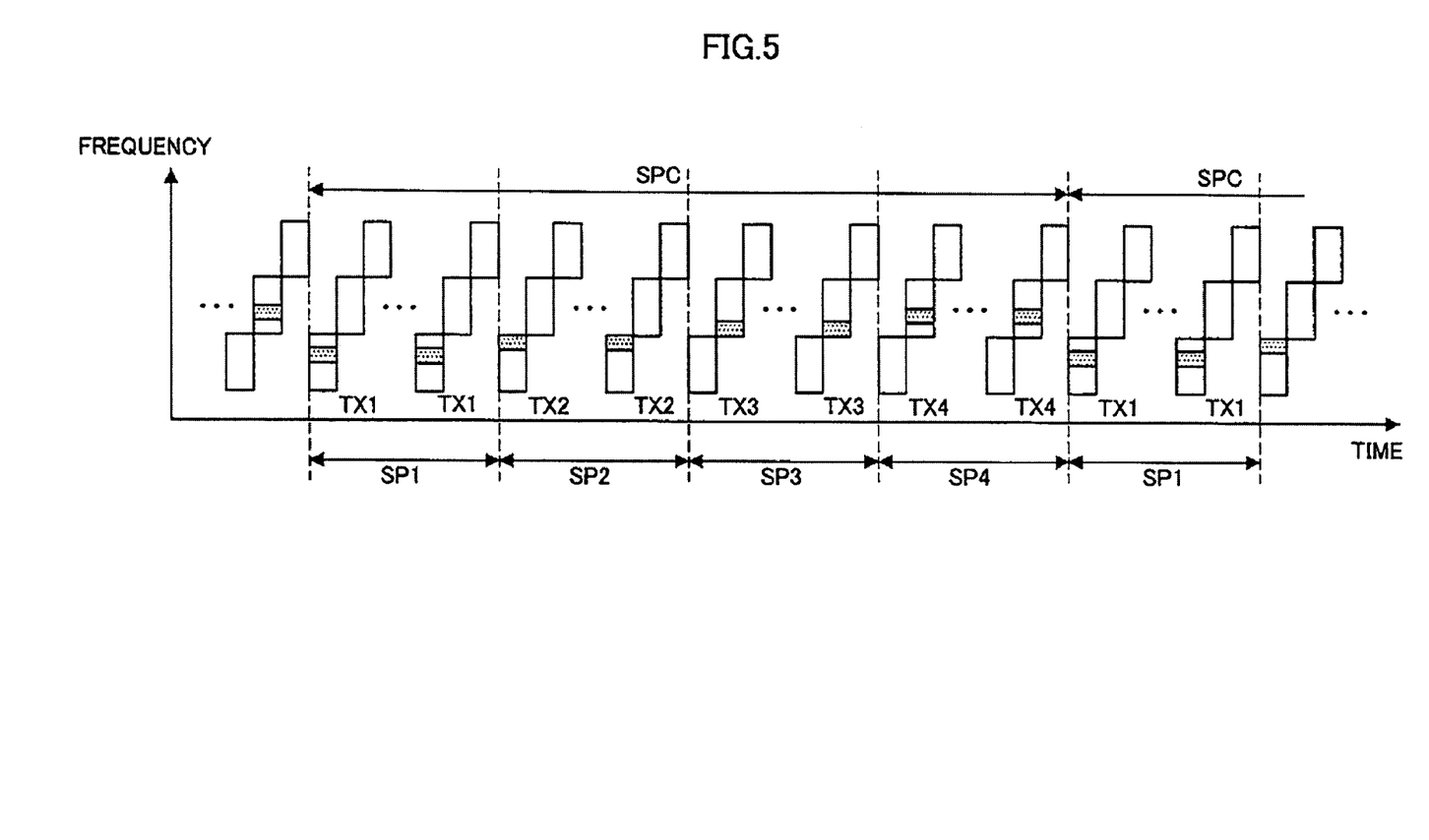
FIG. 5 is a schematic view showing the state where signals TX1, TX2, TX3 and TX4 sequentially transmitted from the transmission avoidance circuit are orthogonally transformed into the time domain by IFFT and spread in the time domain.

FIG. 5 shows the state where the signals TX1, TX2, TX3 and TX4 sequentially transmitted from the transmission avoidance circuit 108 are orthogonally transformed into the time domain by the IFFT 110 and spread in the time domain. As shown in FIG. 5, the signal TX1 is spread in the time domain and transmitted twice during the interval of the transmission-limited time SP1. Likewise, the signal TX2 is spread in the time domain during the interval of SP2, the signal TX3 is spread in the time domain during the interval of SP3, and the signal TX4 is spread in the time domain during the interval of SP4.

Because the frequency band of the null signal is varied in time sequence in each of the signals TX1 to TX4, the frequency bandwidth in which a transmission power is reduced at a time is minimized, thereby improving the overall throughput. In FIG. 5, the band in which a transmission power is reduced is indicated by dots. In this embodiment, the configuration of a transmission power reducing section that changes the transmission-limited band SB1 to SB4 in time sequence is mainly implemented by the transmission avoidance circuit 108 and the IFFT 110.

Further, in each of TX1 to TX4, the same signals are transmitted in the band of the center frequency F0−M and the band of the center frequency F0+M by frequency domain spreading. Furthermore, the signals transmitted in the band of F0−M and the band of F0+M are spread by interleaving. Likewise, the signals in the center frequency F1±M and the signals in the center frequency F2±M are also spread by frequency domain spreading and interleaving. Therefore, if the replacement with a null signal is performed in the narrow bands SB1 to SB4, it is easy to perform decoding at the receiving end because the signals are spread. On the other hand, if the replacement with a null signal is performed in the relatively wide band SB as shown in FIG. 10(b), one of the signals spread in the frequency domain is entirely replaced with a null signal, and it may be difficult to perform decoding at the receiving end. Therefore, by narrowing the bandwidth to be replaced with a null signal, it is possible to suppress the occurrence of a packet error and reliably improve the communication throughput in this embodiment.

Figure 6:
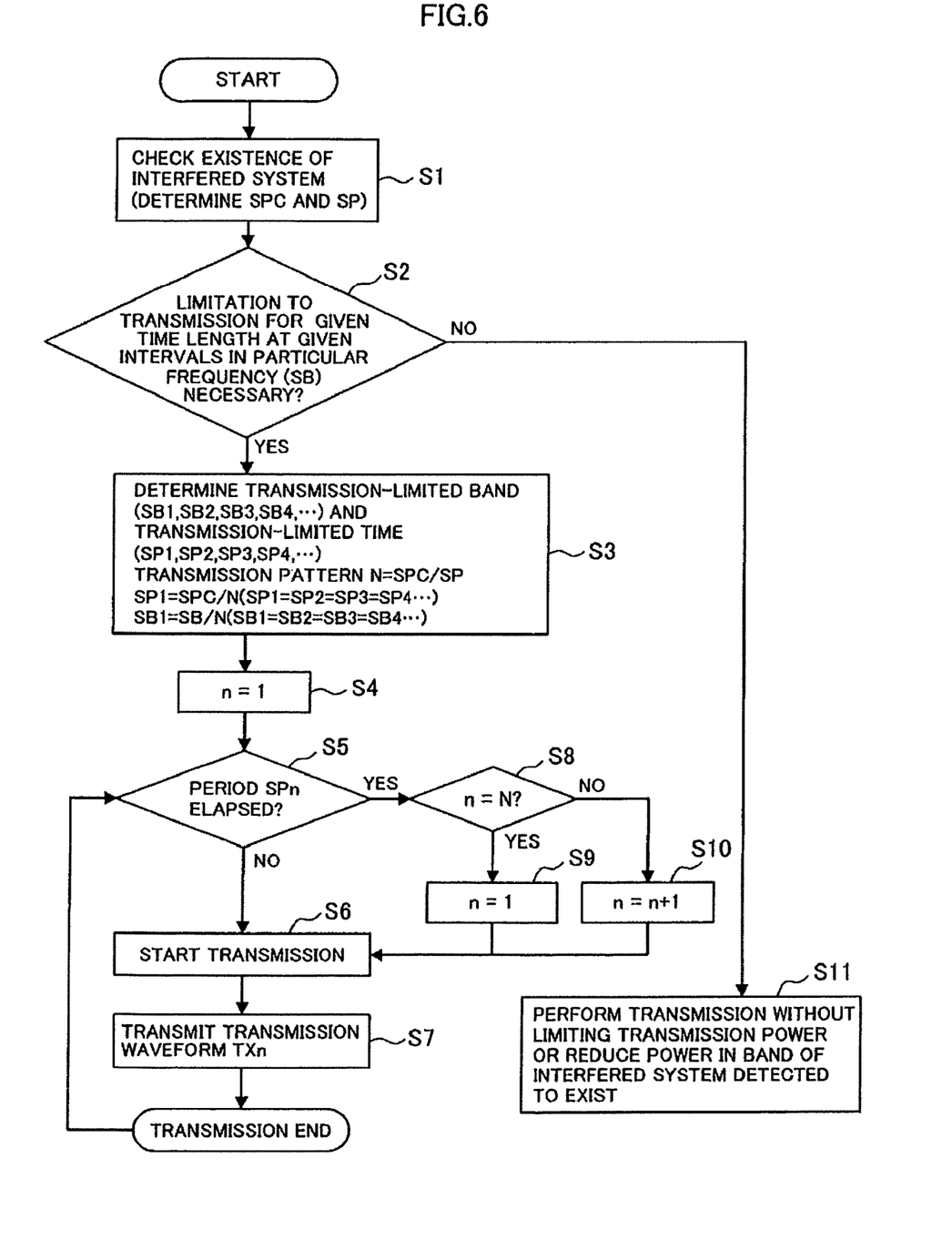
FIG. 6 is a flowchart showing processing in the transmitting apparatus according to the embodiment.

FIG. 6 is a flowchart showing processing in the transmitting apparatus 100 according to the embodiment. Firstly, in the step S1, the existence of an interfered system is checked. In this step, information such as a frequency band in which a transmission power is to be reduced is acquired from information such as a country and a region where the transmitting apparatus 100 is currently used. The acquired information includes the silent period time SP, the interval SPC and the band SB to set the silent period, which are described with reference to FIG. 10. Further, it is checked in the step S1 whether communication is performed by the interfered system based on the signal level of the interfered system received at the receiving end. The configuration for receiving the signal in the transmitting apparatus 100 may be the same as the configuration of a receiving apparatus 200, which is described later.

In the next step S2, it is determined whether it is necessary to limit transmission at a particular frequency for a given length of time at regular time intervals. In other words, it is determined whether it is necessary to set the silent period according the existence of an interfered system.

If it is determined that an interfered system possibly exists and the silent period is necessary to be set based on the information acquired in the step S1, the process proceeds to the step S3. In other words, when it is determined that an interfered system possibly exists based on information such as a country and a region although it is not detected that communication is performed by the interfered system, the process proceeds to the step S3.

On the other hand, if it is detected in the step S2 that communication is performed by the interfered system by the level of a reception signal, it is necessary to continuously reduce a transmission power in the band in which the interfered system exists. In such a case, the process proceeds to the step S11 and performs processing to constantly reduce a transmission power in the frequency band of the interfered system detected to exist without setting the silent period.

Further, if it is obvious in the step S2 that no interfered system exists based on information such as a country and a region, it is not necessary to reduce a transmission power in the frequency band corresponding to an interfered system. In such a case also, the process proceeds to the step S11 and performs transmission using the whole band without limiting a transmission power.

In the following step S3, the transmission-limited band SB1, SB2, SB3, SB4, etc. and the transmission-limited time SP1, SP2, SP3, SP4, etc. shown in FIGS. 4 and 5, respectively, are determined based on the information about the time SP, the interval SPC and the band SB acquired in the step S1. The silent period time SP, the interval SPC and the band SB may be previously regulated by the legal system of a country, the specifications of an interfered system and so on as described earlier.

When determining the transmission-limited band SB1, SB2, SB3, SB4, etc. and the transmission-limited time SP1, SP2, SP3, SP4, etc., a transmission pattern N is first calculated by the following expression:

$$N = SPC/SP \qquad \text{Expression (1)}$$

The transmission pattern N corresponds to the number of bands (the number of patterns) whose transmission is to be avoided, which is described above with reference to FIG. 4. Because SPC/SP=4 in the example of FIG. 4, the number of transmission-avoided bands is four (SB1, SB2, SB3 and SB4). The value of the transmission pattern N is not limited to a calculation result of the expression (1), and it may be set as appropriate. Although four kinds of transmission-limited bands are set in the example of FIG. 4, it is feasible to set two kinds of transmission-limited bands and double the width of each transmission-limited band (e.g. to the width of SB1+SB2), for example.

Next, using the transmission pattern N calculated by the expression (1), the transmission-limited time SP1, SP2, SP3, SP4, etc. and the transmission-limited band SB1, SB2, SB3, SB4, etc. are calculated by the following expressions:

$$SP1 = SPC/N \qquad \text{Expression (2)}$$

$$SB1 = SB/N \qquad \text{Expression (3)}$$

The transmission-limited band SB1, SB2, SB3, SB4, etc. is a frequency bandwidth in which a transmission power is reduced, having the relationship of SB1=SB2=SB3=SB4, etc. The transmission-limited time SP1, SP2, SP3, SP4, etc. is a time when limiting transmission in the transmission-limited band SB1, SB2, SB3, SB4, respectively, having the relationship of SP1=SP2=SP3=SP4, etc.

Accordingly, by the above expressions (1), (2) and (3), the silent period, which has been set for the time SP in each interval SPC, can be spread over the transmission-limited time SP1, SP2, SP3, SP4, etc. within the interval SPC. Further, although the silent period has been set to the wide band SB, it can be spread over the narrower band SB1, SB2, SB3, SB4, etc. It is thereby possible to suppress the occurrence of a packet error and reliably improve the communication throughput.

If a fraction results from the calculation of the expressions (1), (2) and (3), the fraction is adjusted so as to equalize the transmission-limited time (SP1=SP2=SP3=SP4, etc.) and equalize the transmission-limited band (SB1=SB2=SB3=SB4, etc.). Further, there is a frequency band in which a signal level does not originally exist as indicated by the portion "Null" in FIG. 10. If there is such a portion, the above calculation is performed after subtracting the bandwidth of Null from the bandwidth of SB.

Then, in the step S4, the value of the counter n that specifies the transmission-limited time SPn=SP1, SP2, SP3, SP4, etc. and the transmission-limited band SBn=SB1, SB2, SB3, SB4, etc. is set to 1 (n=1).

In the subsequent step S5, it is determined whether the period SPn has elapsed at the current time, and if the period SPn has not elapsed, transmission is started in the step S6, and a transmission waveform TXn is transmitted in the step S7. After the transmission waveform TXn is transmitted in the step S7, the process returns to the step S5 and repeats the subsequent processing.

If, on the other hand, the period SPn has elapsed in the step S5, the process proceeds to the step S8. It is determined in the step S8 whether the counter value n reaches the transmission pattern N (n=N), and if n=N is satisfied, the process proceeds to the step S9. In the step S9, because the counter value n reaches the transmission pattern N and transmission of the last pattern whose transmission is avoided in the interval SPC is completed, the counter value is set to n=1, and transmission for the transmission-limited time SP1 in the transmission-limited band SB1 is performed in the step S6 and subsequent steps.

On the other hand, if it is determined in the step S8 that the counter value n does not reach the transmission pattern N, 1 is added to the counter value n (n=n+1) in the step S10, and transmission with the next transmission pattern is performed in the step S6 and subsequent steps.

For example, when SPC=16 ms, SP=4 ms and SB=90 MHz, N=4 from the expression (1), so that the number of transmission signal patterns for transmission power reduction is four (TX1 to TX4) as shown in FIGS. 4 and 5. In this case, the total 90 MHz band is transmitted with a reduced transmission power during the interval of SPC, and if one subcarrier is 5 MHz and the bandwidth of Null is 10 MHz in the example of FIG. 4, a transmission power is reduced for 4 carriers (20 MHz) at a time. Accordingly, the signals are transmitted in the order of TX1, TX2, TX3, TX4, TX1, etc. within the given interval SPC as shown in FIG. 4, and a transmission power is always reduced in any subcarrier of SB1 to SB4, thereby reducing the number of subcarriers in which a power is reduced in one transmission pattern. The processing of FIG. 6 may be implemented by causing the transmitting apparatus 100 as a computer to function by a program (software) that is stored in memory included in the transmitting apparatus 100, for example.

Because the bandwidth of one carrier is 10 MHz in the WiMAX specification, if the transmission-limited band is set to be narrower, it fails to receive a signal of an interfered system, thus failing to detect the existence of an interfered system. Accordingly, it is preferred to determine the bandwidth of the transmission-limited band (SB1, SB2, SB3, SB4, etc.) by taking the band of an interfered system into consideration.

Figure 7:
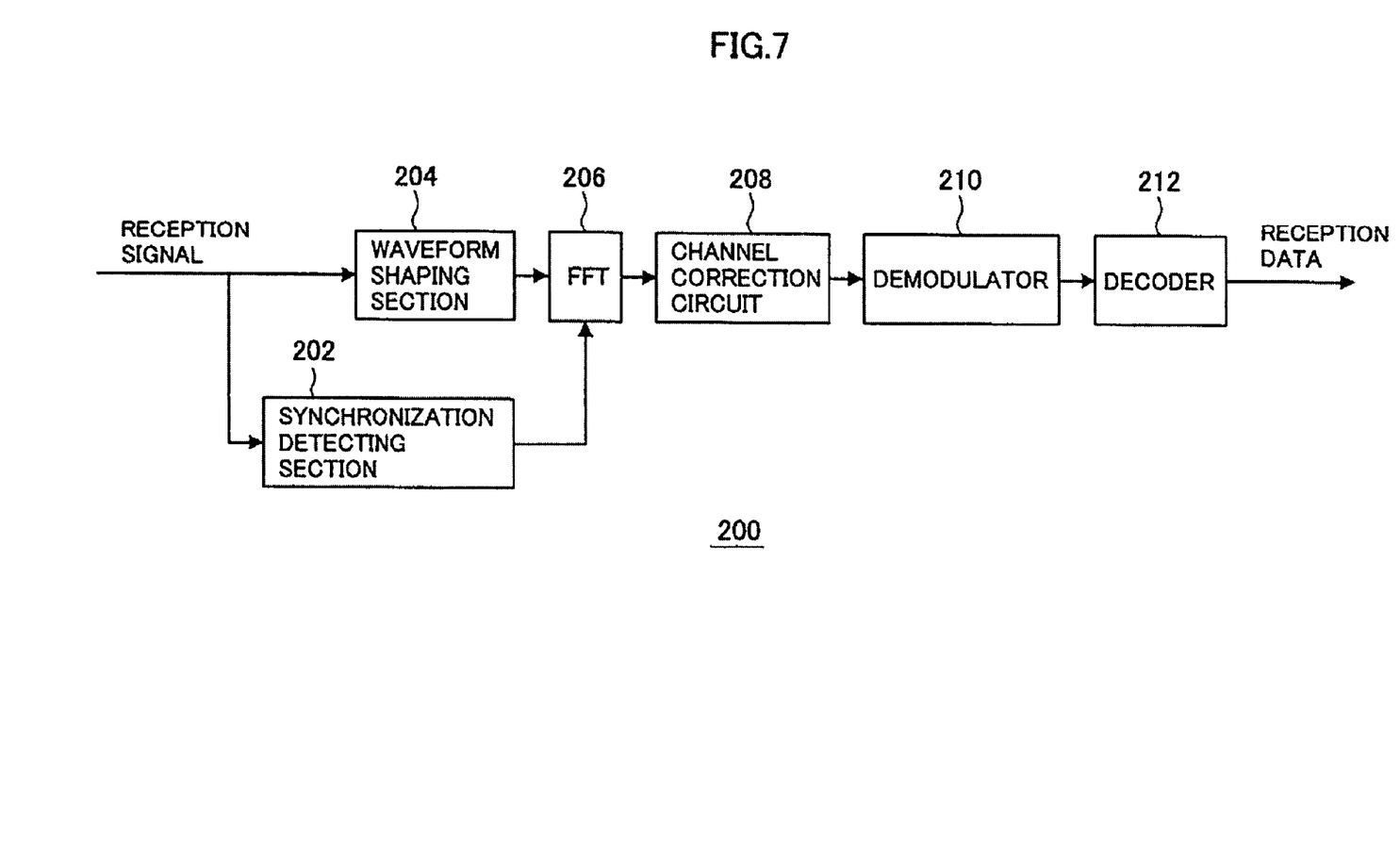
FIG. 7 is a schematic view showing an example of the configuration of a receiving apparatus to receive a signal transmitted from the transmitting apparatus.

FIG. 7 is a schematic view showing an example of the configuration of the receiving apparatus 200 to receive a signal transmitted from the transmitting apparatus 100. The transmitting apparatus 100 and the receiving apparatus 200 are connected over a wireless communication network by OFDM so as to communicate with each other. FIG. 7 mainly shows the configuration of a baseband processing section in a physical layer in an OFDM receiver, and the configuration of an upper layer such as an analog RF processing section that receives a radio signal and a MAC that processes decoded reception data is not shown.

The analog RF processing section (not shown) amplifies a radio signal that is received via an antenna using a low noise amplifier (LNA) and performs frequency synthesis with a local signal to thereby down-concert the signal to an analog baseband signal. Further, it eliminates an unnecessary component different from a desired signal using a bandpass filter (BPF), amplifies the signal using a variable gain amplifier (VGA), and then performs analog to digital conversion.

A synchronization detecting section 202 detects a synchronization timing from the reception signal in which multipath fading has occurred in a propagation path with use of a preamble portion of a packet. The transmitting apparatus 100 inserts the repetitive signal Tr into the guard interval period only when sending out a preamble signal, so that the receiving apparatus 200 can acquire synchronization with high accuracy.

A waveform shaping section 204 performs waveform shaping by conducting cyclic addition to the head of the effective symbol using the guard interval portion or a delayed wave component that extends from the effective symbol of the reception signal to the guard interval portion. In the OFDM communication technology that inserts a null signal to the guard interval, by cyclically adding the component subsequent to the effective symbol of the reception signal to the delayed wave component at the head of the effective symbol, the signal waveform of the guard interval portion to which the delayed wave component at the head of the reception symbol is added becomes continuous, thereby eliminating interference between subcarriers. The method of cyclic addition and the detailed operation of the waveform shaping section 204 are described later.

The fast Fourier transformer (FFT) 206 performs Fourier transform on the signal of a given symbol length. A time-domain signal is thereby transformed into a frequency-domain signal.

A channel correction circuit 208 performs channel correction processing such as equalization, phase tracking and residual frequency offset compensation. The reception signal after the channel correction is demodulated by quadrature phase shift keying (QPSK), for example, by a demodulator 210, and further decoded using an error correcting code by a decoder 212 to become reception data. The reception data is then processed by the upper layer of a communication protocol.

Figure 8:
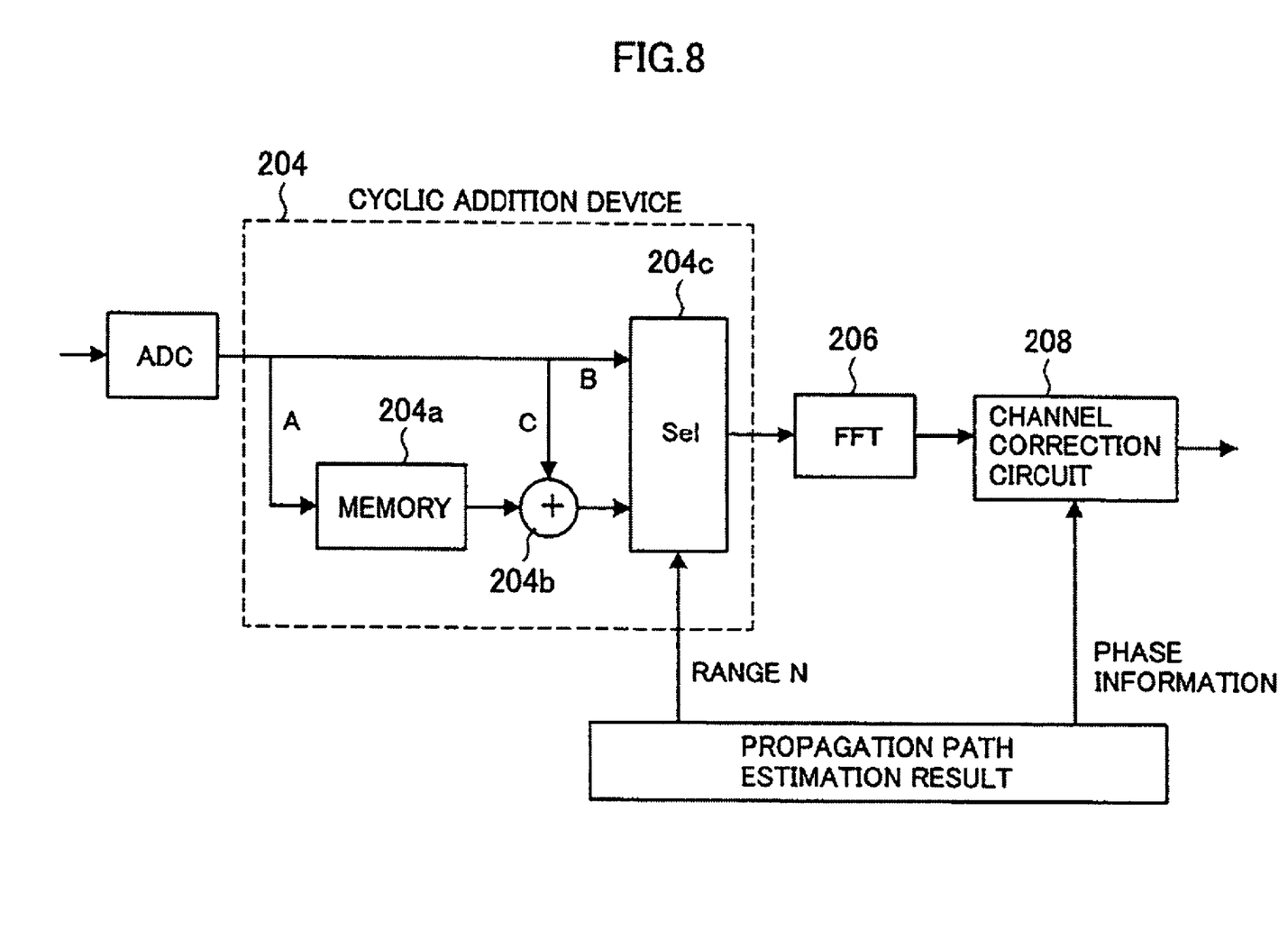
FIG. 8 is a schematic view showing an example of the configuration of a waveform shaping section configured to determine the range of cyclic addition based on an estimation result of a propagation path.
Figure 9A:
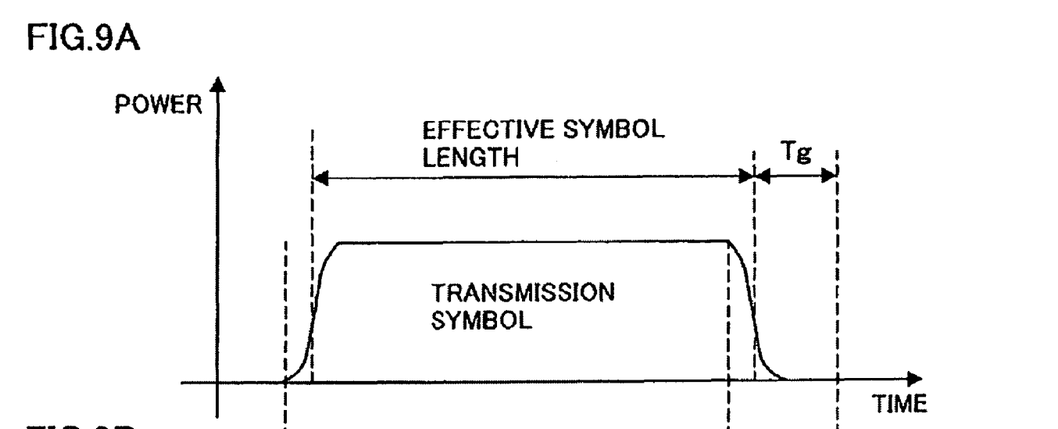
FIG. 9 is a schematic view to explain processing by the waveform shaping section.
Figure 9B:
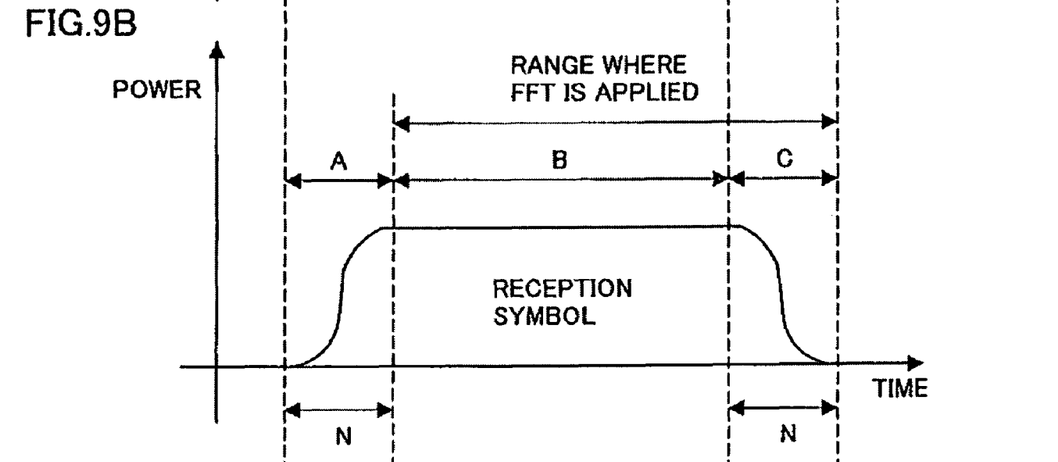
Figure 9C:
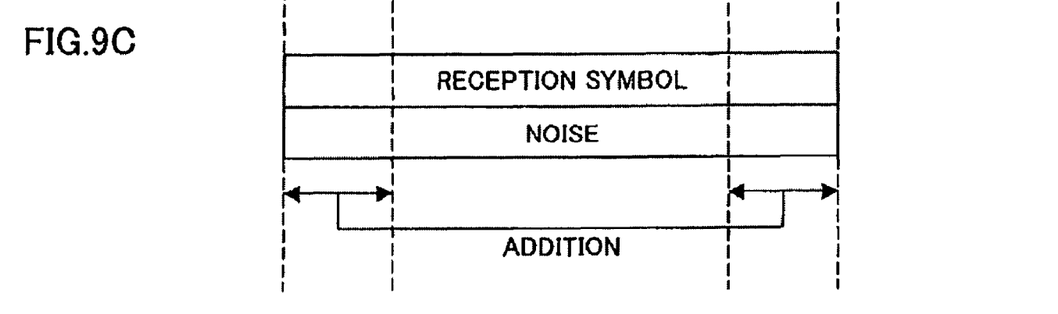

FIG. 8 is a schematic view showing an example of the configuration of the waveform shaping section 204 that is configured to determine the range of cyclic addition based on an estimation result of a propagation path. FIG. 9 is a schematic view to explain processing by the waveform shaping section 204. FIG. 9(a) shows a transmission signal, and FIG. 9(b) shows a reception signal. FIG. 9(c) shows the way of cyclic addition. The operation of the waveform shaping section 204 is described hereinafter with reference to FIGS. 8 and 9.

As shown in FIG. 9(a), in the transmission signal, the guard interval Tg is added after the effective symbol length of the transmission symbol. When such a signal is received, the effect of a delay appears in the reception symbol, so that the reception symbol is longer than the transmission symbol. Thus, the symbol extends off the head of the range to which FFT is applied as shown in FIG. 9(b). In the waveform shaping section 204, the extending portion A in FIG. 9(b) corresponding to the range N of cyclic addition is retrieved and stored into memory 204a, and the portion B of the effective symbol length is output to a selector 204c in the subsequent stage. Then, the portion C extending off the end of the effective symbol and corresponding to the range N of cyclic addition is retrieved, added with the portion A stored in the memory 204a (cf. FIG. 9(c)) by an adder 204b, and output to the selector 204c. The selector 204c selectively outputs the portion B of the effective symbol length and the signal (A+C) added by the adder 204b to the FFT 206 in the subsequent stage.

The range N of cyclic addition may be determined on the basis of calculation of a maximum delay time based on an estimation result of a propagation path, for example. Further, the range N of cyclic addition may be regarded as a sum of a time-domain expansion Nc occurring by the effect of a multipath and a time-domain expansion Nw occurring by the window function in the waveform shaping section 116 of the transmitting apparatus 100 (N=Nc+Nw). Thus, the range N may be determined based on whether a notch is added in the transmitting apparatus 100 or may be determined according to the coefficient of the window function. It is thereby possible to reduce the time-domain expansion of the reception signal due to the addition of a notch, thus suppressing degradation of reception characteristics.

As shown in FIG. 9(b), FFT is applied to the ranges of B and C. As a result of the cyclic addition processing, the signal waveform of the guard interval portion to which the delayed wave component at the head of the reception symbol is added becomes continuous. It is thereby possible to reduce the time-domain expansion of the reception signal even if the signal waveform is expanded in the time domain due to the effect of a multipath, waveform shaping by the window function and so on, thus reliably suppressing interference between subcarriers. This minimizes the noise component added to the reception symbol, thereby improving a reception SNR. Further, the waveform shaping section 204 capable of conducting cyclic addition can be configured easily by the memory 204a, the adder 204b and the selector 204c.

As described in the foregoing, according to the embodiment, when it is necessary to reduce a transmission power for a given length of time at regular intervals in order to detect the existence of an interfered system, it is possible to minimize the number of subcarriers (bandwidth) in which a transmission power is reduced. This prevents significant degradation of reception characteristics during the silent period. Further, because the bandwidth in which a transmission power is reduced is minimized, the receiving apparatus can reliably decode the signal that is spread by time domain spreading, frequency domain spreading, DCM modulation and so on.

It should be understood by those skilled in the art that various modifications, combinations, sub-combinations and alterations may occur depending on design requirements and other factors insofar as they are within the scope of the appended claims or the equivalents thereof.

What is claimed is:

1. A transmitting apparatus comprising:
   a transmission avoidance circuit that receives information relating to one or more frequency bands of a multicarrier signal in which transmission power is to be reduced, wherein at least a portion of the one or more frequency bands is at a same frequency as at least a portion of a frequency band of a different signal; and
   a transmission power reducing section that reduces a power of a transmission signal in a frequency band of the one or more frequency bands of the multicarrier signal, wherein:
      the transmission power reducing section reduces the power of the transmission signal in the frequency band according to a time sequence,
      at least a portion of the frequency band of the multicarrier signal is at a same frequency as at least a portion of a frequency band of a different signal,
      the frequency band of the different signal is one of a number of frequency bands in which transmission power is to be reduced in the multicarrier signal, and
      the time sequence is a time sequence within the frequency band of the different signal.

2. The transmitting apparatus according to claim 1, wherein:
   the information includes at least a silent period time and a time interval, and
   the number of frequency bands is set to a value obtained by dividing the interval by the silent period time.

3. The transmitting apparatus according to claim 2, wherein the information further includes a bandwidth over which transmission power is to be reduced, and wherein a bandwidth of the frequency band is set to a value obtained by dividing the bandwidth over which transmission power is to be reduced by the number of frequency bands in which transmission power is to be reduced.

4. The transmitting apparatus according to claim 1, further comprising:
   an antenna to transmit a transmission signal.

5. A communication system including a transmitting apparatus and a receiving apparatus connected over a wireless communication network, wherein
   the transmitting apparatus includes:
      a transmission avoidance circuit that receives information relating to one or more frequency bands of a multicarrier signal in which transmission power is to be reduced, wherein at least a portion of the one or more frequency bands is at a same frequency as at least a portion of a frequency band of a different signal; and
      a transmission power reducing section that reduces a power of a transmission signal in a frequency band of the one or more frequency bands of the multicarrier signal, the transmission power reducing section reducing the power of the transmission signal in the frequency band according to a time sequence; and
   the receiving apparatus includes:
      a waveform shaping section that receives the transmission signal and shapes a waveform of the transmission signal by cyclic addition to add a signal component extending from an effective symbol portion of the transmission signal received from the transmitting apparatus to an opposite end of the effective symbol portion.

6. A computer-implemented transmitting method comprising the steps of:
   receiving, at a transmission avoidance circuit, information relating to one or more frequency bands of a multicarrier signal in which transmission power is to be reduced, wherein at least a portion of the one or more frequency bands is at a same frequency as at least a portion of a frequency band of a different signal;
   reducing a power of a transmission signal in a frequency band of the one or more frequency bands of the multicarrier signal, wherein:
      the power of the transmission signal in the frequency band is reduced according to a time sequence,
      at least a portion of the frequency band of the multicarrier signal is at a same frequency as at least a portion of a frequency band of a different signal,
      the frequency band of the different signal is one of a number of frequency bands in which transmission power is to be reduced in the multicarrier signal, and
      the time sequence is a time sequence within the frequency band of the different signal.

7. A computer-readable medium storing a program that, when executed by a computer, causes the computer to perform a method, the method comprising:
   receiving information relating to one or more frequency bands of a multicarrier signal in which transmission power is to be reduced, wherein at least a portion of the one or more frequency bands is at a same frequency as at least a portion of a frequency band of a different signal;
   reducing a power of a transmission signal in a frequency band of the one or more frequency bands of the multicarrier signal, wherein:
      the power of the transmission signal in the frequency band is reduced according to a time sequence,
      at least a portion of the frequency band of the multicarrier signal is at a same frequency as at least a portion of a frequency band of a different signal,
      the frequency band of the different signal is one of a number of frequency bands in which transmission power is to be reduced in the multicarrier signal, and
      the time sequence is a time sequence within the frequency band of the different signal.

* * * * *